Aug. 3, 1965

J. O. MELTON ETAL 3,198,508

SPACER FOR INSERTION BETWEEN ADJACENT
CONVOLUTIONS OF A COIL SPRING

Filed Aug. 7, 1964

INVENTORS
JAMES O. MELTON &
THOMAS B. WILKINSON

BY

*Dunlap & Laney*

ATTORNEYS

United States Patent Office 3,198,508
Patented Aug. 3, 1965

3,198,508
SPACER FOR INSERTION BETWEEN ADJACENT CONVOLUTIONS OF A COIL SPRING
James O. Melton, Norman, and Thomas B. Wilkinson, Oklahoma City, Okla., assignors to Jamco, Inc., Oklahoma City, Okla., a corporation of Oklahoma
Filed Aug. 7, 1964, Ser. No. 388,040
6 Claims. (Cl. 267—61)

This invention relates to a spacing element for adjusting the effective length of a coil spring which is normally retained under compression between two bodies spaced from each other. More particularly, but not by way of limitation, the present invention relates to a spacing element adapted for insertion between adjacent convolutions of a coil spring of the type utilized in automobile running gear.

Coil springs of the type which are utilized in the front and rear suspension of an automobile running gear become fatigued after extended periods of usage, and sag and undergo compression to an undesired extent as a result of age, overloading or hard driving over bad roads. The results of such fatiguing of these coil springs are an uneven carriage of the automobile body and failure of the springs to function effectively in preventing metal-to-metal contact and in cushioning the ride afforded. Fatigued, sagging springs also cause the automobile to steer erratically and less easily during application of the brakes.

It has heretofore been the practice of automobile maintenance personnel to effect a partial correction of the undesirable results stemming from the fatiguing and sagging of the coil springs by inserting spacer blocks between some of the convolutions of the springs, or by inserting an arcuate spacing element underneath the spring between the lowermost convolution thereof and the spring retainer which is attached to the A-shaped lower control arm of the automobile. Insertion of spacers of the type described functions to increase the axial distance between the upper and lower control arms to its original dimension by prying or wedging apart the convolutions of the coil springs.

The types of spacing blocks or spacers which have previously been utilized to correct the sagging spring situation have been of two general types, both of which are usually constructed of a metal such as aluminum. One of the types of spacers utilized comprises a small, generally rectangular block which is inserted between the convolutions of the spring intermediate the ends of the spring. Such blocks are grooved to accommodate the spring convolutions so that when the block is inserted between the two adjacent spring convolutions, the convolutions are received in opposed grooves located on opposite sides of the block and spaced from each other by a distance corresponding to the thickness of the spacer between the troughs of the grooves.

The other type of spacer which has previously been used to increase the effective length of a fatigued coil spring comprises an aluminum block of generally annular configuration which carries a groove in its upper surface, and which rests upon the spring retainer of the lower control arm of the automobile. The lowermost convolution of the spring is supported in the mating groove in the top of the annular spacer. The aluminum metal of which this type of spacer is constructed is made sufficiently soft to permit the effective diameter of the spacer to be altered to adapt the spacer for cooperation with springs of various sizes. In the case of both of the types of spacers previously utilized, utilization of the metallic construction in the spacer results in the generation of a considerable noise when the spring flexes and frictionally slides upon the spacers. Moreover, there is, in the case of both of the spacers described above, a considerable degree of difficulty encountered in inserting the spacers between the convolutions of the coil spring, or between the lowermost convolution of the spring and the spring retainer of the lower control arm. Wedging forces of considerable magnitude are required in order to wedge the convolutions apart a sufficient distance to permit the spacers to be inserted. This is not only a time-consuming and difficult task, but presents a not inconsiderable safety hazard to personnel who may suffer from mashed or pinched fingers as a result of the wedging tools slipping out from between the convolutions of the spring.

A further disadvantage of the types of spacers previously in use is the relatively incompressible characteristic of such spacers. When the spacers are inserted between the convolutions of the automobile coil spring, a certain amount of the resiliency in the coil spring is necessarily lost due to the introduction of the rigid metallic spacer into the spring. In other words, even though the spacers may effectively increase the overall length of the coil spring by forcing apart two or more of the convolutions thereof, the spacers in effect act as rigid columns placed in compression between the two members which are spaced apart by the coil spring, and to the extent that the rigid spacer constitutes a portion of the total length of the coil spring, the resiliency of the coil spring is reduced. The rigid or incompressible nature of these types of spacers also results in the earlier destruction of the spacers due to the cracking or splitting of the spacers as the coil spring in which the spacers are positioned is subjected to severe road shocks, and also to overloading of the vehicle in which the coil springs are incorporated.

In our U.S. Patent 3,141,611 issued July 21, 1964, a new type of coil spring spacer is disclosed in which a pair of spacer elements interconnected by a resilient member, such as a small coil spring, are used for spacing apart adjacent convolutions of a heavy coil spring of the type used in automobiles. Each of the spacer blocks or elements is grooved to receive its respective convolution of the coil spring, and the blocks are made of a high density synthetic plastic or resin which does not squeak or generate noise as the contacting convolutions of the coil spring move on the spacer elements. Moreover, the inclusion of the resilient element between the spacer blocks prevents a loss or decrease in the overall resiliency of the coil spring in which the spacer is inserted.

The present invention comprises a novel and highly effective spacer of the type which is used by inserting the spacer between two adjacent convolutions of a coil spring. The spacer includes and retains many of the advantages of the spacer described in our above-referenced patent. The spacer of the present invention is constructed of a high density synthetic resin which is silent in its operative contact with the metallic convolutions of the coil spring in which it is inserted. Further than this, the coil spring spacer of the present invention is much more easily inserted than many types of coil spring spacers heretofore in use, and is constructed to permit a certain amount of resiliency or compression to be retained across the spring interval bridged by the spacer as a result of the geometric configuration of the spacer and its high density synthetic resin material of construction.

Broadly described, the spacer of the present invention comprises a generally elongated body of high density synthetic resin having a pair of generally cylindrical openings formed in each end thereof for receiving the adjacent convolutions of the coil spring in which the spacer is to be inserted. The generally cylindrical openings formed at each end of the spacer are preferably of slightly smaller diameter than the diameter of the convolutions of the helical spring in which the spacer is to be used so that when these convolutions are engaged by the cylindrical openings of the spacer, retaining forces are stored in the spacer by resilient deformation, and the adjacent convolutions of the coil spring are tightly gripped to prevent loss of the spacer during use.

To more specifically described a preferred embodiment of the present invention, the coil spring spacer of the invention comprises an elongated, solid body of high density synthetic resin which has formed in each end thereof, a generally cylindrical opening or socket. These cylindrical sockets are partially defined by hook-shaped portions at each end of the spacer which are of a thickness such that said hook-shaped portions can undergo resilient deformation to permit the convolutions of the coil spring in which the spacer is to be used to be forced into the cylindrical sockets to seat the spacer in the coil spring. A pair of open slots are formed in the sides of the spacer and communicate with the cylindrical sockets at the opposite ends of the spacer so that adjacent convolutions of the coil spring in which the spacer is to be inserted may be forced through said open slots into the cylindrical sockets. An inwardly extending bevel or taper is preferably formed on the side faces of the spacer and forms one side of the open slots so that the principle of the inclined plane or wedge may be used to aid the mechanic in seating the spacer between the convolutions of the coil spring. The open slots may be provided on the same side of the spacer, or on opposite sides thereof in order to afford greater flexibility in the techniques and procedures used for inserting the spacer in the coil spring. In other words, in some instances, the structural environment of the coil spring in which the spacer is to be inserted may make it much easier to insert the spacer between adjacent convolutions of the spring when the open slots for pressing the convolutions into the receiving cylindrical sockets are positioned on opposite sides of the spacer than will be the case where such slots are positioned on the same side of the spacer.

From the foregoing description of the invention, it will be apparent that the present invention provides a novel spacer for insertion between adjacent convolutions of fatigued coil springs, which spacer possesses properties of resilience sufficient to permit some compression of the coil spring in the area carrying the spacer when compressional forces of large magnitude are brought to bear upon the spring.

Another object of the present invention is to provide a spacer which may be utilized between the convolutions of a coil spring to restore the coil spring more nearly to its original, unfatigued status than has been heretofore possible utilizing conventional metallic spacers.

An additional object of the present invention is to provide a spacer for insertion between adjacent convolutions of a coil spring of the type used on automobiles, which spacer positively interlocks with adjacent convolutions of the coil spring so that the spacer cannot be lost from between such convolutions as the spring is suddenly expanded as a result of a dip or depression in the road which permits the convolutions of the coil spring to be opened apart to a greater extent than they are opened when under normal loading.

Another object of the present invention is to provide spacers for insertion between adjacent convolutions of coil springs carrying a compressionable load, which spacers can be more easily inserted between adjacent convolutions of the coil springs than the types of spacers heretofore in use.

Other objects and advantages, in addition to those hereinbefore described and discussed, will become apparent to the reader as the following detailed description of the invention is read in conjunction with a perusal of the accompanying drawings which illustrate our invention.

Figure 1:
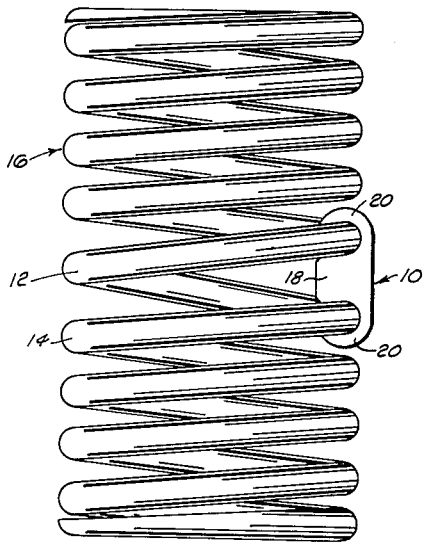
FIGURE 1 is a view in elevation illustrating the manner in which the spacer of the invention is inserted between adjacent convolutions of the coil spring.
Figure 2:
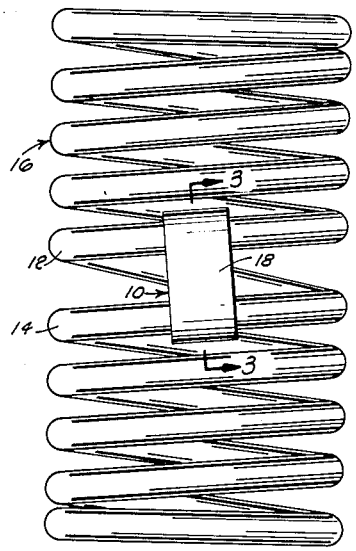
FIGURE 2 is a view similar to FIGURE 1, but taken 90° around the coil spring from the point of view illustrated in FIGURE 1.

Referring now to the drawings in detail, and particularly to FIGURE 1, the spacer of the invention is designated generally by reference character 10 and is used for engaging and biasing apart adjacent convolutions 12 and 14 of a coil spring designated generally by reference character 16. The coil spring will generally be of relatively heavy construction and is typified by the types of coil springs used in the suspension systems or running gear of automobiles. The spacer 10 may be inserted between any two adjacent convolutions throughout the length of the spring, and this will normally be determined by the particular position on the coil spring at which fatiguing or sagging of the convolutions is most pronounced.

Figure 3:
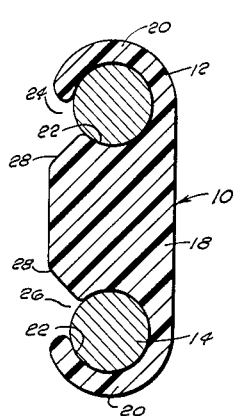
FIGURE 3 is a sectional view taken on line 3—3 of FIGURE 2.

A specific construction of one embodiment of the spacer of the invention is best illustrated in FIGURE 3 of the drawings. The spacer comprises a generally elongate body 18 of relatively rigid material having high mechanical strength. Preferably, the body 18 is constructed of a high density synthetic resin such as high density polyethylene or nylon. The advantages accruing from the use of such high density resins will be hereinafter discussed in greater detail. The elongate body 18 is generally rectangular in transverse cross-section and is preferably provided with rounded end portions 20. Spaced inwardly from each end of the elongate body 18 are a pair of generally cylindrical openings or sockets 22.

In referring to FIGURE 3, it will be noted that the rounded end portions 20 of the spacer 10 are relatively thin due to the close proximity to the end portions of the cylindrical sockets 22. The rounded end portions can thus be biased outwardly away from the elongated body 18 to a slight extent to permit resilient gripping of the convolutions 12 and 14 of the coil spring 16.

A pair of spaced, open slots 24 and 26 are formed in one side of the elongate body 18 and communicate with the cylindrical sockets 22 formed in each end of the body. An inwardly extending bevel 28 is formed in the elongated body 18 and defines one side of the open slots 24 and 26 to facilitate the insertion of the convolutions of the coil spring into the cylindrical sockets 22, as hereinafter described in greater detail. The side of the slots opposite the beveled side 28 is formed by the free ends of the rounded end portions 20.

Figure 4:
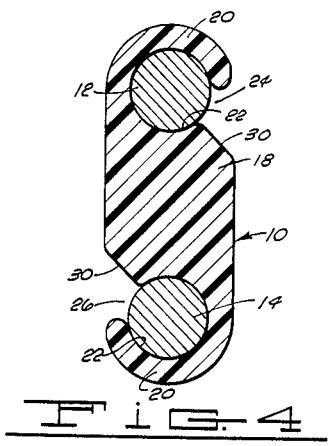
FIGURE 4 is a sectional view similar to FIGURE 3, but illustrating a modified embodiment of the present invention.

A slightly modified alternate embodiment of the present invention is illustrated in FIGURE 4. Here the open slots 24 and 26 are formed on opposite sides of the elongated body 18 so that the beveled surfaces 30, corresponding to beveled surfaces 28 in the embodiment of FIGURE 3, extend substantially parallel with each other and are formed on opposite sides of the spacer.

In using the spacer of the present invention, one of the convolutions of the coil spring in which the spacer is to be inserted, such as the convolution 12 illustrated in FIGURE 1, is forced into the cylindrical socket 22 in one end of the elongated body 18. Forcing of the convolution into the cylindrical socket 22 is facilitated by the beveled surface 28 which acts as an inclined plane or wedge to permit the convolution to be forced through the relatively narrow open slot 24. The rounded end portions 20 are, as has been indicated, relatively thin and therefore can be resiliently deformed to permit the convolution to be forced through the open slots into the respective cylindrical sockets 22.

After one of the convolutions has been forced into the cylindrical socket 22 at one end of the elongated body 18, the spacer 10 is then pivoted about the axis of the convolution until the cylindrical socket at the other end of the elongated body is in relatively close proximity to the next adjacent convolution of the spring. In many instances, the spring will have become fatigued to the extent that some wedging apart or spreading of the adjacent convolutions will be required to bring the lower convolution into alignment with the open slot 26. Once the convolution has been thus aligned, however, the lower end of the spacer 10 may be struck with a hammer or otherwise pressed over the lower convolution of the spring so that the lower convolution is wedged through the mouth of the open slot 26 and snaps into the lower cylindrical socket 22. In some instances, the spring will not have become fatigued to the extent that the adjacent convolutions which are to be spread apart by the spacer have moved so close to each other that the use of a wedging or spacing tool to pry them apart is required. In other words, the lowermost convolution may still, without wedging, be positioned at a point such that the inclined plane or wedge effect of the beveled surface 28 may alone be relied upon to force the lower convolution through the open slot 26 into the lower cylindrical socket 22.

Although the insertion of the spacer 10 has been described as it can be accomplished by first snapping the uppermost of the two convolutions into the upper cylindrical socket 22 of the spacer, it will be apparent that the spacer can also be inserted in substantially the same manner by initially snapping the lower of the two convolutions into its respective socket, then pivoting the spacer into close proximity to the upper convolution and finally snapping the upper convolution into place.

The modified embodiment of the invention illustrated in FIGURE 4 is inserted in a coil spring in generally the same manner as that employed in inserting the embodiment illustrated in FIGURE 3. There will, however, be some situations in which the structure surrounding and forming the environment of the coil spring prevents pivotation or positioning of the embodiment of the spacer embodiment shown in FIGURE 3 in a way which will permit rapid and easy insertion of the spacer without removal of some of the structure surrounding the coil spring. Frequently, in this situation, the form of the spacer illustrated in FIGURE 4 can be employed without encountering any interference from the structure which may surround the coil spring. In other words, where it would be necessary, for example, to place the spacer shown in FIGURE 3 above or to the side of the uppermost convolution in order to drive the convolution into the cylindrical socket 22, the embodiment illustrated in FIGURE 4 could be inserted by initially placing the upper end of the elongated body 18 of the spacer beneath, or predominantly beneath, the uppermost convolution of the spring and driving this convolution into its respective socket while the spacer was in this position. In general, the spacer illustrated in FIGURE 4 will be characterized by a longer effective operating life than the embodiment illustrated in FIGURE 3 because forces of compression exerted on the coil spring in which the spacers are inserted will tend to be balanced out and counteracted by the form of spacer illustrated in FIGURE 4 better than in the FIGURE 3 embodiment.

From the foregoing description of the invention, it is believed that it will have become readily apparent that the spacers of the present invention can be more quickly and easily inserted than the metallic block type spacers heretofore widely used. In many instances, due to the wedging effect of the beveled surfaces 28 and 30 on the spacers, the spacers can be forced into position without the use of any wedging or convolution opening tool. The resilient loading of the rounded end portions 20 helps maintain the spacer in position over the entire operating life of the spring, and the properties of compressibility and resilience which are characteristic of the preferred high density synthetic resin material of construction reduce the extent to which greater rigidity is imparted to the coil spring by the use of the spacers.

Although specific embodiments of the present invention have been heretofore described by way of example, it is contemplated that some changes and rearrangements in the described and depicted structures may be effected without departing from the basic principles which underlie the invention. Insofar, therefore, as changes of this nature do not entail a relinquishment of, or departure from, the basic principles of the invention, it is intended that all such modifications and changes be circumscribed by the spirit and scope of the invention except as the same may be necessarily limited by the appended claims or reasonable equivalents thereof.

What is claimed is:

1. In combination, a coil spring and a spacer for spacing adjacent convolutions thereof, said spacer comprising:
    an elongate body having
        a convolution receiving socket in each end thereof, said sockets each being configured to surround a major portion of the received convolution, and said body further having
        a pair of open slots communicating with said sockets from at least one lateral side of said elongate body, said slots each providing a passage for admitting one of said convolutions to one of said sockets and each having a smaller opening into its respective socket than the convolution to be passed therethrough whereby the convolution must be forced through said slots into said sockets, thereby preventing loss of said spacer upon flexing of said spring.

2. The combination as claimed in claim 1 wherein one side of each of said open slots is tapered inwardly from a side of said elongate body to the respective socket with which said open slots communicate whereby each of said slots is wider at the side of said elongate body in which it is formed than at its juncture with its respective convolution receiving socket.

3. The combination as claimed in claim 1 wherein said elongate body has a resilient rounded portion at each of its ends and forming a portion of each of said convolution receiving sockets.

4. The combination as claimed in claim 1 wherein said spacer is constructed of a high density synthetic resin.

5. The combination as claimed in claim 3 wherein one side of each of said open slots is tapered inwardly from a side of said elongate body to the respective socket with which said open slots communicate and wherein said rounded portions are each of semi-circular cross-section and terminate in a free end spaced across one of said open slots from the tapered side of the respecitve slot.

6. A spacer article useful for spacing adjacent convolutions of a coil spring, said spacer comprising an elongate resilient body having a convolution receiving socket in each end thereof, said sockets each being configured to surround a major portion of the received convolution, and said body further having a pair of open slots communicating with said sockets from at least one lateral side of said elongate body, said slots each providing a passage for admitting one of said convolutions to one of said sockets and having an opening of at most about 90° of the inner periphery of said socket, whereby the convolution to be passed through said slots must be forced through said openings into said sockets, thereby allowing said spacer to be readily retained upon a convolution.

References Cited by the Examiner

UNITED STATES PATENTS

| | | | |
|---|---|---|---|
| 2,292,140 | 8/42 | Lofgron | 24—129.2 |
| 2,344,858 | 3/44 | Farmer | 267—61 |
| 2,673,084 | 3/54 | Blythe | 267—33 |
| 2,785,515 | 3/57 | Tobias | 24—129.2 |
| 3,128,087 | 4/64 | Hughes | 267—61 |
| 3,141,661 | 7/64 | Melton et al. | 267—33 |

FOREIGN PATENTS 688,260   3/53   Great Britain.

ARTHUR L. LA POINT, *Primary Examiner.*